United States Patent

Parker et al.

(10) Patent No.: US 8,718,978 B2
(45) Date of Patent: May 6, 2014

(54) PERFORMANCE LOGGING FRAMEWORK

(75) Inventors: Steven D. Parker, San Francisco, CA (US); Christopher P. Jalbert, San Jose, CA (US)

(73) Assignee: Apple Inc., Cupertino, CA (US)

( * ) Notice: Subject to any disclaimer, the term of this patent is extended or adjusted under 35 U.S.C. 154(b) by 496 days.

(21) Appl. No.: 13/036,423

(22) Filed: Feb. 28, 2011

(65) Prior Publication Data

US 2012/0221293 A1 Aug. 30, 2012

(51) Int. Cl.
*G06F 11/30* (2006.01)

(52) U.S. Cl.
USPC .................. 702/182; 707/705; 709/217

(58) Field of Classification Search
USPC ................................ 702/182, 186
See application file for complete search history.

(56) References Cited

U.S. PATENT DOCUMENTS

| | | | | |
|---|---|---|---|---|
| 5,796,633 | A * | 8/1998 | Burgess et al. | 702/187 |
| 5,961,596 | A * | 10/1999 | Takubo et al. | 709/224 |
| 6,052,694 | A * | 4/2000 | Bromberg | 1/1 |
| 6,175,835 | B1 * | 1/2001 | Shadmon | 707/696 |
| 6,208,345 | B1 * | 3/2001 | Sheard et al. | 715/853 |
| 6,208,993 | B1 * | 3/2001 | Shadmon | 1/1 |
| 6,405,364 | B1 * | 6/2002 | Bowman-Amuah | 717/101 |
| 6,662,357 | B1 * | 12/2003 | Bowman-Amuah | 717/120 |
| 6,917,950 | B2 * | 7/2005 | Mcbride et al. | 1/1 |
| 6,993,454 | B1 * | 1/2006 | Murstein et al. | 702/182 |
| 7,099,799 | B2 | 8/2006 | Huard | |
| 7,136,778 | B2 * | 11/2006 | Duron et al. | 702/182 |
| 7,328,127 | B2 | 2/2008 | Otsuka et al. | |
| 7,480,647 | B1 * | 1/2009 | Murstein et al. | 1/1 |
| 7,512,613 | B2 * | 3/2009 | Taitel | 1/1 |
| 8,271,494 | B2 * | 9/2012 | Heisig et al. | 707/737 |
| 2005/0086243 | A1 * | 4/2005 | Abbott et al. | 707/100 |
| 2005/0138083 | A1 * | 6/2005 | Smith-Semedo et al. | 707/200 |
| 2006/0041609 | A1 | 2/2006 | Pellar | |
| 2007/0283317 | A1 * | 12/2007 | Sadler et al. | 717/103 |
| 2008/0005092 | A1 * | 1/2008 | Kleewein et al. | 707/4 |
| 2008/0010497 | A1 * | 1/2008 | Kronlund et al. | 714/6 |
| 2008/0306712 | A1 | 12/2008 | Chen | |
| 2010/0036894 | A1 * | 2/2010 | Senda et al. | 707/202 |
| 2010/0131317 | A1 | 5/2010 | Duffy et al. | |
| 2010/0332401 | A1 * | 12/2010 | Prahlad et al. | 705/80 |
| 2011/0029484 | A1 * | 2/2011 | Park et al. | 707/634 |
| 2011/0258612 | A1 * | 10/2011 | Matthiesen et al. | 717/128 |
| 2011/0258614 | A1 * | 10/2011 | Tamm | 717/129 |
| 2012/0072399 | A1 * | 3/2012 | Taitel et al. | 707/687 |
| 2013/0024424 | A1 * | 1/2013 | Prahlad et al. | 707/640 |

* cited by examiner

*Primary Examiner* — Sujoy Kundu
*Assistant Examiner* — Alvaro Fortich
(74) *Attorney, Agent, or Firm* — Blakely, Sokoloff, Taylor & Zafman LLP

(57) ABSTRACT

Techniques for logging performance data are described herein. According to one embodiment, in response to a request for logging performance data, where the request includes a data type indicating a type of performance data and an actual performance data value, a non-linear mathematical operation is performed on the performance data value to generate an index value. The performance data represents a performance measurement of a predetermined operation performed by a data processing system. Thereafter, a value of a data field in a performance data store that stores the performance data is updated based on the type of the performance data and the index value. The value of the data field is updated without having to lock the data field for purpose of simultaneously accesses.

18 Claims, 5 Drawing Sheets

| Index / Type | 0 | 1 | 2 | ... | N |
|---|---|---|---|---|---|
| 0 | | | | | |
| 1 | | 301 | 302 | | |
| ... | | | | | |
| M | | | | | |

FIG. 3

PERFORMANCE LOGGING FRAMEWORK

FIELD OF THE INVENTION

Embodiments of the present invention relate generally to computer systems. More particularly, embodiments of the invention relate to logging performance data of computer systems.

BACKGROUND

One operation in fine-tuning and troubleshooting of information systems, such as a computer application, is to measure the "performance" (time taken) to deliver a requested result from that system. Performance tools have been developed which measure certain events from an operating system perspective by measuring the time taken to process operations such as computations and I/O (Input/Output).

Typically, the performance data is stored in a database for subsequent analysis of the performance. The performance data is typically stored in a linear fashion where the data is stored under the particular performance category. For example, when a particular measured operation (e.g., a Web access operation) is completed within one second, the performance data corresponding to the one second category is updated. Similarly, when such an operation is completed within two seconds, the corresponding performance data is updated, etc. Such a configuration requires a significantly large storage space to store the performance data. In addition, when performance data is accessed (e.g., logged), a locking mechanism has to be in place for simultaneous accesses. This tends to slow down the access of the performance data, particularly, when there are many clients attempting to access the same performance data.

SUMMARY OF THE DESCRIPTION

Techniques for logging performance data are described herein. According to one embodiment, in response to a request for logging performance data, where the request includes a data type indicating a type of performance data and an actual performance data value, a non-linear mathematical operation is performed on the performance data value to generate an index value. The performance data represents a performance measurement of a predetermined operation performed by a data processing system. Thereafter, a value of a data field in a performance data store that stores the performance data is updated based on the type of the performance data and the index value. The value of the data field is updated without having to lock the data field for purpose of simultaneously accesses.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

FIG. 3 is an example of a data structure that can be used to store the performance data being logged.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a performance data logging system is provided to store performance data in an efficient way to reduce an amount of storage space required while still provides sufficient performance logging information. In one embodiment, the performance data is stored in a non-linear fashion, in which certain categories are aggregated or condensed according to a predetermined mathematical algorithm. In one particular embodiment, the performance data is stored based on a logarithm (Log) based distribution, such as, for example, a Log 2 based distribution. In addition, according to one embodiment, the locking mechanism is not required for multiple clients to access the same performance data. Thus, even though there may be a chance of missing some logging activities or data because the locking mechanism is not utilized, since the performance data is stored in an aggregated or condensed manner, such a configuration still can provide sufficiently accurate enough data for the purpose of evaluating performance of a data processing system or a component running within the data processing system.

Figure 1:
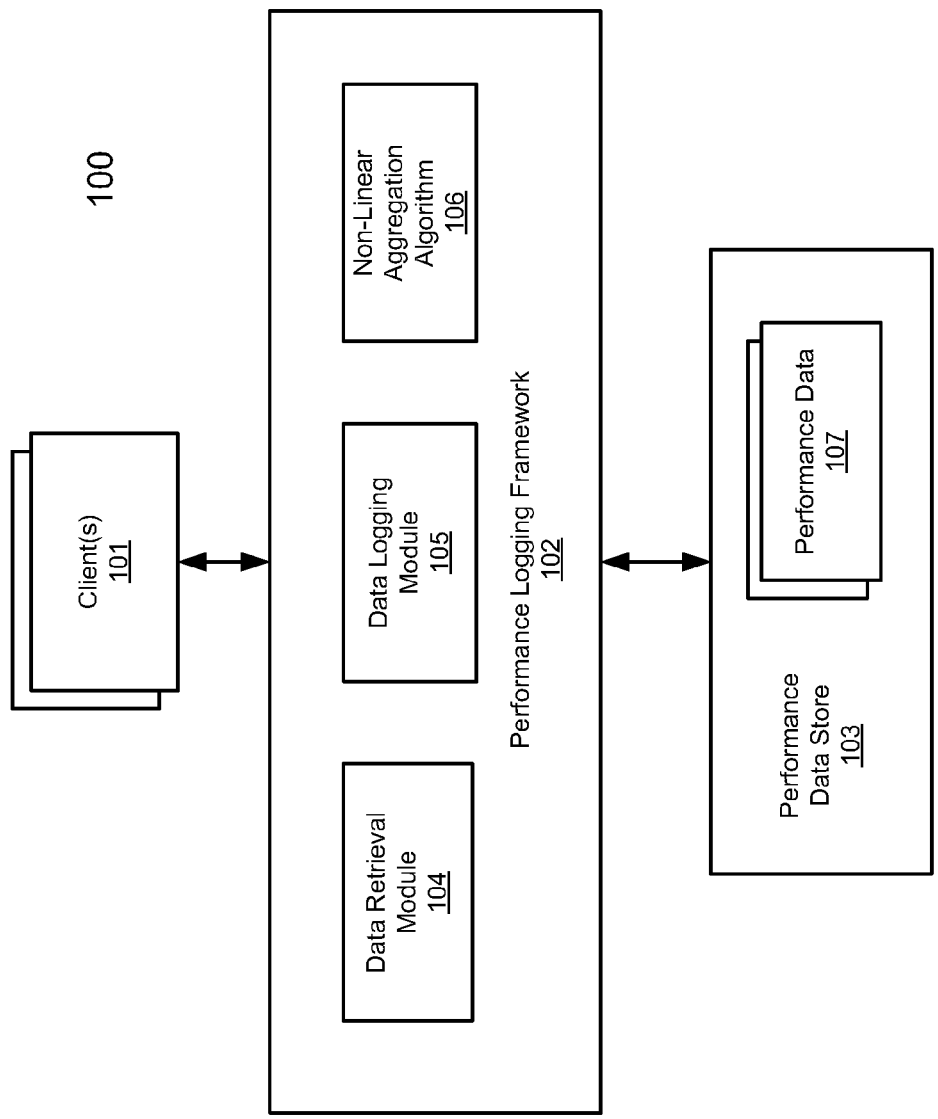
FIG. 1 is a block diagram illustrating a performance data logging system according to one embodiment of the invention.

FIG. 1 is a block diagram illustrating a performance data logging system according to one embodiment of the invention. Referring to FIG. 1, system 100 includes performance data logging framework 102 to allow one or more clients 101 accessing performance data stored in performance data store 103. For example, system 100 may represent software architecture of a computer server providing an application programming interface (API) to allow clients 101 to store or retrieve performance data to and from data store 103. Client 101 may be a daemon running within a local system that monitors or measure performance of the local system and is configured to store or retrieve the performance data in data store 103. Alternatively, client 101 may be a remote client that measures performance of a remote system and is configured to store or retrieve performance data in data store 103 over a network, which may be a local area network (LAN), a wide area network (WAN), or a combination of both. Data store 103 may be implemented in a local storage device such as a hard drive of system 100. Alternatively, data store 103 may be implemented in a remote storage device such as a network-based storage server.

In one embodiment, when a request for logging performance data is received at logging framework 102 from client 101, the request includes an event identification (ID) identifying a particular event that has been measured and the actual measured data value. In response to the request, data logging module 105 is configured to perform a non-linear mathematical operation based on non-linear mathematical algorithm 106 on the data value. The result of the non-linear mathematical operation is used as an index or reference to identify one of data elements of a data set associated with the event ID. The value of the identified data element is then updated (e.g., incremented or decremented) accordingly.

Figure 2:
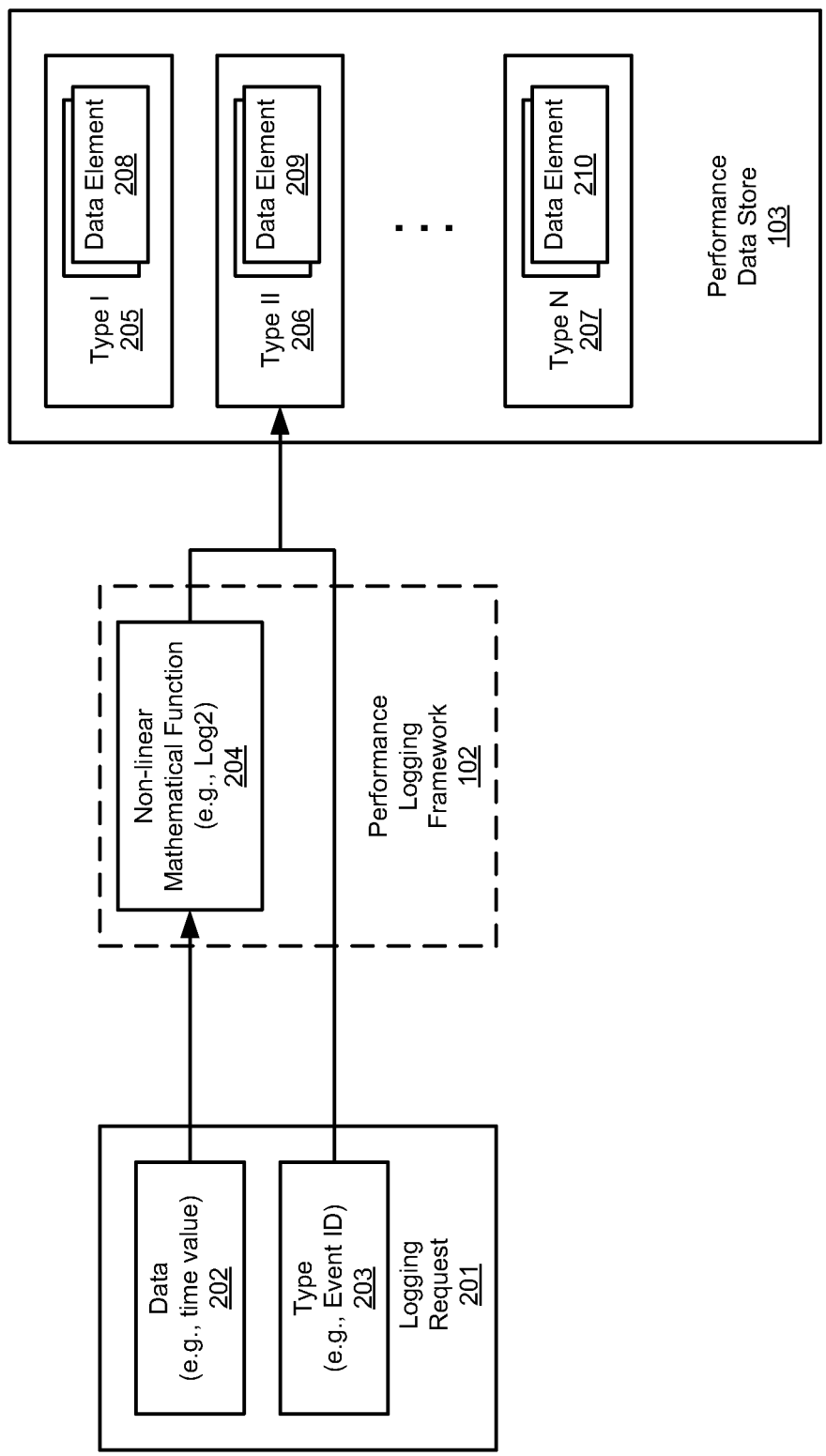
FIG. 2 is a block diagram illustrating a process of updating performance data according to one embodiment of the invention.

For example, referring to FIG. 2, a request 201 for logging performance data includes type 203 indicating a type of performance data to be logged and actual data value 202. When request 201 is received at logging framework 102, mathematical function 204 is utilized to perform a non-linear mathematical operation, such as a Log 2 operation, on the data value 202. The result of the mathematical operation in combination with the type information 203 is used to identify one of data elements 208-210 of types 205-207 stored in data store 103. In one embodiment, the data stored in data store is organized based on the types (e.g., events 205-207 being logged) of data. Each type of performance data includes an array of data elements, each data element corresponding to a category of performance data (e.g., 1 second, 10 second, or 1 minute categories) of a particular type. Once the data element has been identified based on the mathematical result and the type information, the data value of the identified data element is updated (e.g., increment or decrement).

Figure 3:
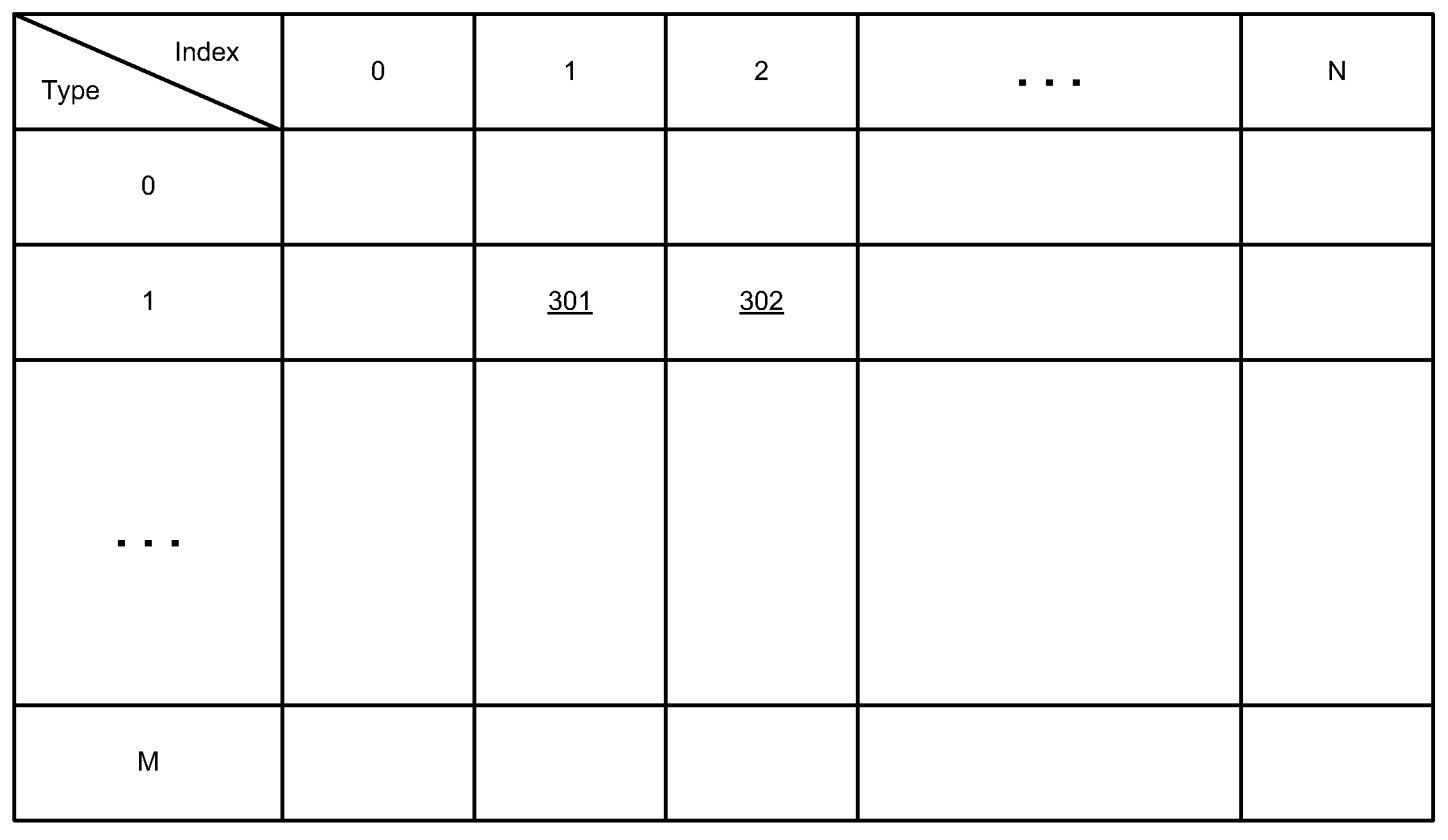

Data in data store 103 can be stored in a variety of data structures or tables. FIG. 3 is an example of a data structure that can be used to store the performance data being logged. Referring to FIG. 3, in this example, the data can be stored in a table having rows and columns, where each row represents a type of performance data and includes multiple data elements as columns. Each request for logging performance data is examined based on its type information and the result of mathematical operation on its data value. The logarithm (or log) of a number to a given base is the power to which the base must be raised in order to produce that number. For example, the logarithm of 1000 to base 10 is 3, because 10 to the power of 3 is 1000: $10^3=1000$. The logarithm of x to the base b is written as $\log_b(x)$, such as $\log_{10}(1000)=3$. Logarithmic scales reduce wide-ranging quantities to smaller scopes. In one embodiment, the non-linear mathematical operation is a logarithm operation. In one particular embodiment, the logarithm operation is a Log 2 operation. However, it is not so limited; other logarithm operations such as Log 10 based operations may also be applied.

For example, when a request is received having an event ID as 1 and data value is between 2 to 4 seconds (e.g., greater than or equal to 2 and less than 4 with a proper rounding or truncating operation), assuming that the non-linear mathematical function is Log 2 based function, data element 301 will then be updated (e.g., incremented or decremented). On the other hand, if the data value being logged is between 4 and 8 seconds (e.g., greater than or equal to 4 and less than 8 with a proper rounding or truncating operation), data element 302 will be updated. As can be shown data element 302 represents more performance data categories than data element 301, and thus is more condensed, which in turn saves more storage space. The distribution of the data is non-linear: the higher the index is, more condensed the data element is. In addition, the data structure as shown in FIG. 3 can be made constantly available. The access of the data structure can be performed without having to require locking the data element being accessed for simultaneous accessing or wait for the lock to be released from another client, etc. As a result, the speed of the data logging can be greatly improved. On the other hand, this may also miss some logging events due to the access without locking, which may happen rarely. A data point may be lost only when two data points are extremely close to each other in time. If more data are lost, it may be due to that specific condition in frequent, and the count would still be substantially close to the correct value. As a result, the score for that bracket will still be relatively high. However, due to the aggregated data logging using a non-linear mathematical operation, the data can still has sufficient accuracy.

In one embodiment, in computer programming space, such as C/C++ programming language, the data structure as shown in FIG. 3 can be implemented as a two-dimensional (2D) array. In response to a request having "type" information and actual data "value," the corresponding data element can be updated, in this example, incremented as follows:

DataTable [type] [Log 2(value)]++;

The data stored in data structure as shown in FIG. 3 can be subsequently retrieved by data retrieval module 104 of FIG. 1. Data retrieval module 104 may also provide certain analysis such as a histogram of the data as needed.

Figure 4:
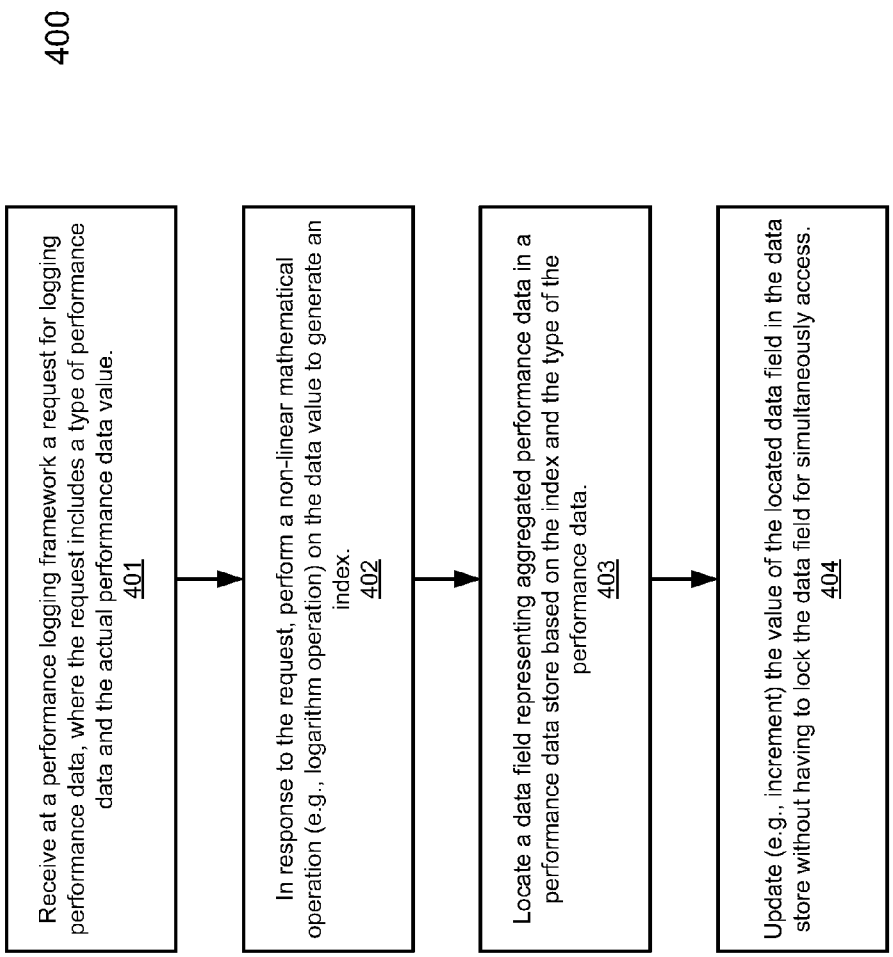
FIG. 4 is a flow diagram illustrating a method for logging performance data according to one embodiment of the invention.

FIG. 4 is a flow diagram illustrating a method for logging performance data according to one embodiment of the invention. Method 400 can be performed by processing logic which may include software, hardware, or a combination thereof. For example, method 400 may be performed by system 100 of FIG. 1. Referring to FIG. 4, at block 401, a request is received at a performance data logging framework for logging performance data, where the request includes a type of the performance data and the actual performance data value to be logged. In response to the request, at block 402, processing logic performs a non-linear mathematical operation (e.g., a logarithm operation) on the data value to generate an index or offset. In one embodiment, the non-linear mathematical operation includes a Log 2 operation. At block 403, a data element or field is located based on the index and the type in a performance data store. At block 404, the value of the located data element is updated without having to lock the data element for simultaneous accesses.

Figure 5:
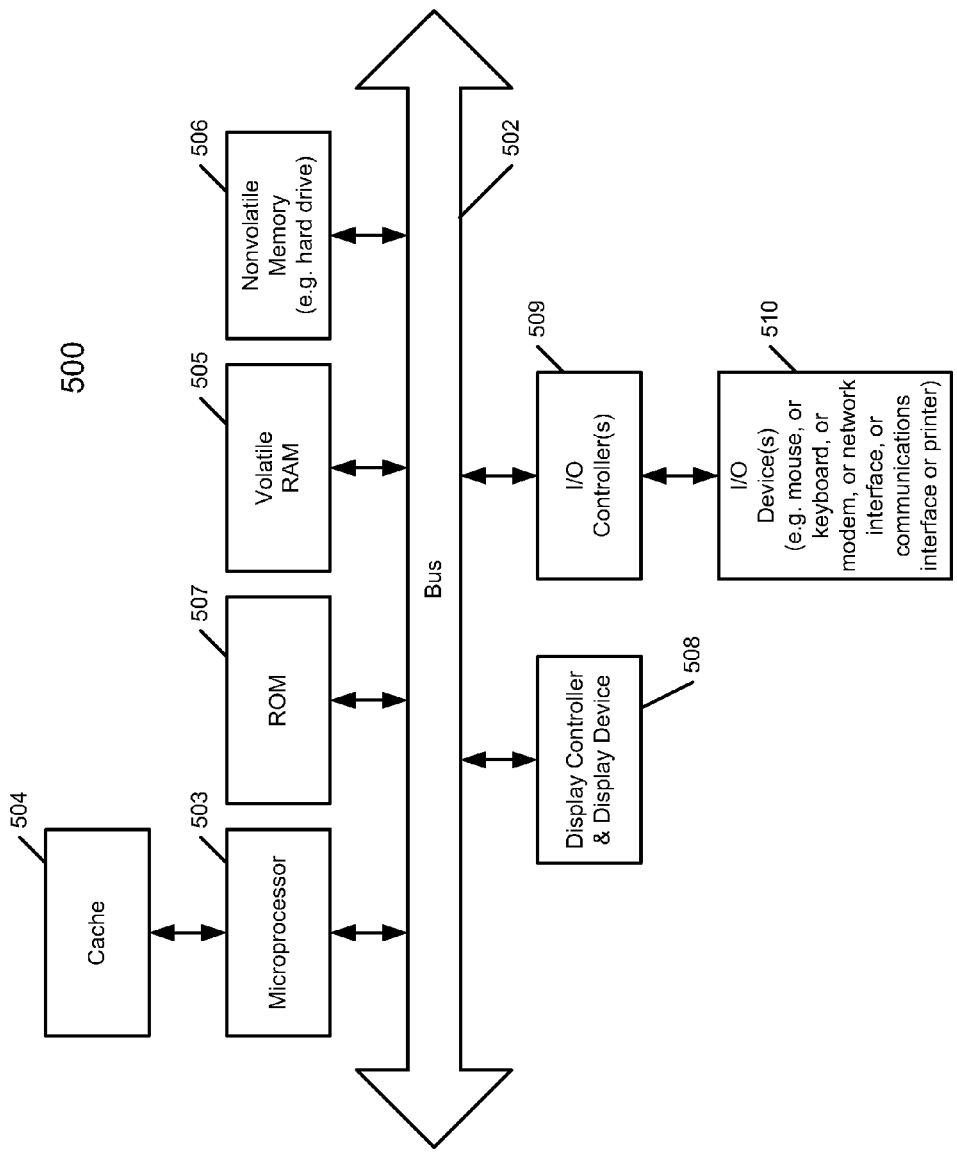
FIG. 5 is a block diagram of a data processing system, which may be used with one embodiment of the invention.

FIG. 5 is a block diagram of a data processing system, which may be used with one embodiment of the invention. For example, the system 500 may be used as part of system 100 of FIG. 1. Note that while FIG. 5 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 5 may, for example, be an Apple Macintosh computer or MacBook, an IBM compatible PC, or a computer server.

As shown in FIG. 5, the computer system 500, which is a form of a data processing system, includes a bus or interconnect 502 which is coupled to one or more microprocessors 503 and a ROM 507, a volatile RAM 505, and a non-volatile memory 506. The microprocessor 503 is coupled to cache memory 504. The bus 502 interconnects these various components together and also interconnects these components 503, 507, 505, and 506 to a display controller and display device 508, as well as to input/output (I/O) devices 510, which may be mice, keyboards, modems, network interfaces, printers, and other devices which are well-known in the art.

Typically, the input/output devices 510 are coupled to the system through input/output controllers 509. The volatile RAM 505 is typically implemented as dynamic RAM (DRAM) which requires power continuously in order to refresh or maintain the data in the memory. The non-volatile memory 506 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 5 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 502 may include one or more buses connected to each other through various bridges, controllers, and/or adapters, as is well-known in the art. In one embodiment, the I/O controller 509 includes a USB (Universal Serial Bus) adapter for controlling USB peripherals. Alternatively, I/O controller 509 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for logging performance data, the method comprising:
   in response to a request for logging performance data, the request including a data type indicating a type of performance data and an actual performance data value, performing a logarithm operation on the performance data value to generate an index value, the type of performance data representing a category of performance in which the actual performance data value belongs, wherein the performance data represents a performance measurement of a predetermined operation performed by a data processing system; and
   updating a value of a data field in a performance data store that stores the performance data, wherein a storage location of the data field is determined based on the type of the performance data and the index value, wherein the value of the data field is updated without having to lock the data field for purpose of simultaneous accesses.

2. The method of claim 1, further comprising prior to updating the value of the data field, locating within the performance data store the data field based on the data type and the index value.

3. The method of claim 2, wherein the logarithm operation is a log 2 based operation.

4. The method of claim 1, wherein updating a value of the data field comprises incrementing the value of the data field.

5. The method of claim 1, wherein the request is received via an application programming interface (API) of a performance logging framework from a client that monitors the performance of the predetermined operation.

6. The method of claim 5, wherein the performance measurement comprises a value representing time spent to perform the predetermined operation by the data processing system.

7. A non-transitory computer-readable storage medium having computer instructions stored therein, which when executed by a computer, cause the computer to perform a method for logging performance data, the method comprising:
   in response to a request for logging performance data, the request including a data type indicating a type of performance data and an actual performance data value, performing a logarithm operation on the performance data value to generate an index value, the type of performance data representing a category of performance in which the actual performance data value belongs, wherein the performance data represents a performance measurement of a predetermined operation performed by a data processing system; and
   updating a value of a data field in a performance data store that stores the performance data, wherein a storage location of the data field is determined based on the type of the performance data and the index value, wherein the value of the data field is updated without having to lock the data field for purpose of simultaneous accesses.

8. The computer-readable storage medium of claim 7, wherein the method further comprises prior to updating the value of the data field, locating within the performance data store the data field based on the data type and the index value.

9. The computer-readable storage medium of claim 8, wherein the logarithm operation is a log 2 based operation.

10. The computer-readable storage medium of claim 7, wherein updating a value of the data field comprises incrementing the value of the data field.

11. The computer-readable storage medium of claim 7, wherein the request is received via an application programming interface (API) of a performance logging framework from a client that monitors the performance of the predetermined operation.

12. The computer-readable storage medium of claim 11, wherein the performance measurement comprises a value representing time spent to perform the predetermined operation by the data processing system.

13. A data processing system, comprising:
a processor; and
a memory coupled to the processor for storing instructions, which when executed from the memory, cause the processor to
in response to a request for logging performance data, the request including a data type indicating a type of performance data and an actual performance data value, perform a logarithm operation on the performance data value to generate an index value, the type of performance data representing a category of performance in which the actual performance data value belongs, wherein the performance data represents a performance measurement of a predetermined operation performed by a data processing system, and
update a value of a data field in a performance data store that stores the performance data, wherein a storage location of the data field is determined based on the type of the performance data and the index value, wherein the value of the data field is updated without having to lock the data field for purpose of simultaneous accesses.

14. The system of claim 13, wherein prior to updating the value of the data field, the data field in the performance data store is located based on the data type and the index value.

15. The system of claim 14, wherein the logarithm operation is a log 2 based operation.

16. The system of claim 13, wherein updating a value of the data field comprises incrementing the value of the data field.

17. The system of claim 13, wherein the request is received via an application programming interface (API) of a performance logging framework from a client that monitors the performance of the predetermined operation.

18. The system of claim 17, wherein the performance measurement comprises a value representing time spent to perform the predetermined operation by the data processing system.

* * * * *